United States Patent
Maguire

[19]

[11] Patent Number: 6,057,514
[45] Date of Patent: May 2, 2000

[54] REMOVABLE HOPPER WITH MATERIAL SHUT-OFF

[76] Inventor: Stephen B. Maguire, 1549 E. Street Rd., Glen Mills, Pa. 19342

[21] Appl. No.: 08/884,172

[22] Filed: Jun. 27, 1997

Related U.S. Application Data

[60] Provisional application No. 60/020,857, Jun. 28, 1996.

[51] Int. Cl.⁷ .......................... G01G 13/18; G01G 21/22
[52] U.S. Cl. ...................... 177/105; 177/253; 222/148; 414/326
[58] Field of Search ..................... 198/532, 548, 198/550.1, 671, 860.4; 222/148, 413, 561, 55; 414/326, 519, 520, 526; 177/59, 71, 78, 92, 98, 99, 100, 105, 108, 116, 119, 253, 262

[56] References Cited

U.S. PATENT DOCUMENTS

| | | | |
|---|---|---|---|
| 2,161,190 | 6/1939 | Paull | 222/55 |
| 3,348,848 | 10/1967 | Lucking et al. | 222/559 |
| 3,959,636 | 5/1976 | Johnson et al. | 366/152 |
| 3,985,262 | 10/1976 | Nauta | 220/349 |
| 4,026,442 | 5/1977 | Orton | 222/181 |
| 4,108,334 | 8/1978 | Moller | 222/136 |

(List continued on next page.)

FOREIGN PATENT DOCUMENTS

| | | |
|---|---|---|
| 0318170 | 5/1989 | European Pat. Off. . |
| 0507689 | 10/1992 | European Pat. Off. . |
| 0587085 | 3/1994 | European Pat. Off. . |
| 0743149 | 11/1996 | European Pat. Off. . |
| 2517087 | 9/1982 | France . |
| 3541532A1 | 11/1985 | Germany . |
| 3923241 | 1/1991 | Germany . |
| 4323295 | 2/1995 | Germany . |
| 2081687 | 2/1982 | United Kingdom . |

OTHER PUBLICATIONS

Sheet of 2 photographs of Mould–Tek gravimetric blender, circa 1993.
Sheet of 2 photographs of Motan gravimetric blender and feeding system with Maguire Products, Inc. controls, circa 1993.

(List continued on next page.)

*Primary Examiner*—Randy W. Gibson
*Attorney, Agent, or Firm*—Charles N. Quinn

[57] ABSTRACT

A gravimetric weigh scale blender having a plurality of hoppers 41, 42 and 43 discharging into a weigh chamber 14. The hoppers are funnel-shaped, each terminating in a discharge opening which permits flow of material from the hopper through a metering device 19 or 38 into a weigh chamber 14. Two of the hoppers are mounted for horizontal sliding displacement in the frame of the blender and a valve is provided at the bottom of each hopper to automatically close the hopper when it is moved horizontally. The valve consists of a shoe 53 slidable on the bottom of the funnel of the hopper to be operated by a saddle 51 on the frame so as to allow flow through the opening when the hopper is in its operating position but is displaced to close the opening when the hopper is moved away from the operating position. An improved metering device is also disclosed which comprises an auger device 70 which includes a trough 71 pivotally mounted under one of the hopper openings for pivotal movement between an operative position adjacent the opening and a clean-out position remote from the opening. An auger is provided in the trough which may be driven at the desired speed to provide a positive metered flow through the trough from the hopper's discharge opening into the weigh chamber.

1 Claim, 3 Drawing Sheets

U.S. PATENT DOCUMENTS

| | | | |
|---|---|---|---|
| 4,148,100 | 4/1979 | Moller | 366/150 |
| 4,354,622 | 10/1982 | Wood | 222/55 |
| 4,402,436 | 9/1983 | Hellgren | 222/561 |
| 4,454,943 | 6/1984 | Moller | 198/657 |
| 4,525,071 | 6/1985 | Horowitz et al. | 235/151.33 |
| 4,581,704 | 4/1986 | Mitsukawa | 364/479 |
| 4,705,083 | 11/1987 | Rossetti | 141/104 |
| 4,756,348 | 7/1988 | Moller | 141/83 |
| 4,793,711 | 12/1988 | Ohlson | 366/18 |
| 4,830,508 | 5/1989 | Higuchi et al. | 366/152 |
| 4,850,703 | 7/1989 | Hanaoka et al. | 366/160 |
| 5,110,521 | 5/1992 | Moller | 222/55 |
| 5,116,547 | 5/1992 | Tsukahara et al. | 264/1.1 |
| 5,132,897 | 7/1992 | Allenberg | 364/149 |
| 5,143,166 | 9/1992 | Hough | 177/128 |
| 5,148,943 | 9/1992 | Moller | 177/50 |
| 5,172,489 | 12/1992 | Moller | 34/72 |
| 5,225,210 | 7/1993 | Shimoda | 425/145 |
| 5,261,743 | 11/1993 | Moller | 366/196 |
| 5,285,930 | 2/1994 | Nielsen | 222/1 |
| 5,340,949 | 8/1994 | Fujimura et al. | 177/25.18 |
| 5,341,961 | 8/1994 | Hausam | 222/217 |
| 5,423,455 | 6/1995 | Ricciardi et al. | 222/1 |
| 5,651,401 | 7/1997 | Cados | 141/129 |
| 5,767,453 | 6/1998 | Wakou et al. | 177/25.18 |
| 5,767,455 | 6/1998 | Mosher | 177/119 |
| 5,780,779 | 7/1998 | Kitamura et al. | 177/105 |
| 5,843,513 | 12/1998 | Wilke et al. | 222/409 |

OTHER PUBLICATIONS

OTHER PUBLICATIONS

Sheet of 3 photographs of UNA–DYN gravimetric blender, circa 1993.

Sheet of 2 photographs of Maguire Products, Inc. gravimetric blender with Conair hoppers and feeding system, circa 1993.

Sheet of 1 photograph of Hydracolor gravimetric blender, circa 1993.

Advertisement entitled "Machinery and Systems for Extrusion is Our Only Business" by Process Control Corporation, circa 1993.

Advertisement entitled "Weigh Blender Delivers Unmatched Accuracy" by Universal Dynamics, Inc., circa 1993.

Advertisement entitled "A Full Line–up of Blender Solution . . . Priced Right!" by HydReclaim, circa 1993.

Advertisement entitled "New from HydReclaim—Now Processors Can Economically Achieve Continuous Gravimetric Blending" by HydReclaim, circa 1993.

Article entitled "Control Loading Systems" from Plastics Technology, Oct. 1995, p. 41.

Advertisement "Introducing our 400 VME–II Gravimetric Blender" by HydReclaim Corporation, circa 1993.

Four page brochure entitled "Gravimix Better Quality through Research", circa 1993.

Four page brochure entitled "Conomix Plus Volumetric Blender" dated Aug. 1993.

Four page brochure entitled "Conair Franklin Autocolor Y Mezclador" dated Mar. 1995.

Two–sided flyer entitled "GB 140 Series Compact Auto Weigh Blender" published by Conair Franklin in the United States, Jun., 1994.

Six page brochure entitled "Graviblend Precise Continuous Weigh Blenders" published by Ktron Vertech, Jun., 1991, United States.

Six page brochure entitled "Piovan Gravimetric Blenders MDW" published by Piovan Srl, Oct. 1993, Venezia, Italy.

One page flyer entitled "Gravimix, The New Gravimetric Blending Generation" published by Ferlin, De demsvaard, Holland, circa 1993.

Four page brochure entitled "When you Weigh it All Up . . . " published by Ferlin Trading, Holland, circa 1993.

Thirty–two page catalog entitled "Maguire Color Blending Equipment" published by Maguire Products, Inc., 1993, United States.

Two page brochure entitled "Mould–Tek Bulk Handling Systems" published by Mould–Tek Industries, Inc. in Canada, circa 1993.

Brochure entitled "Plastic Molders and Extruders:" published by Maguire Products, Inc., 1995.

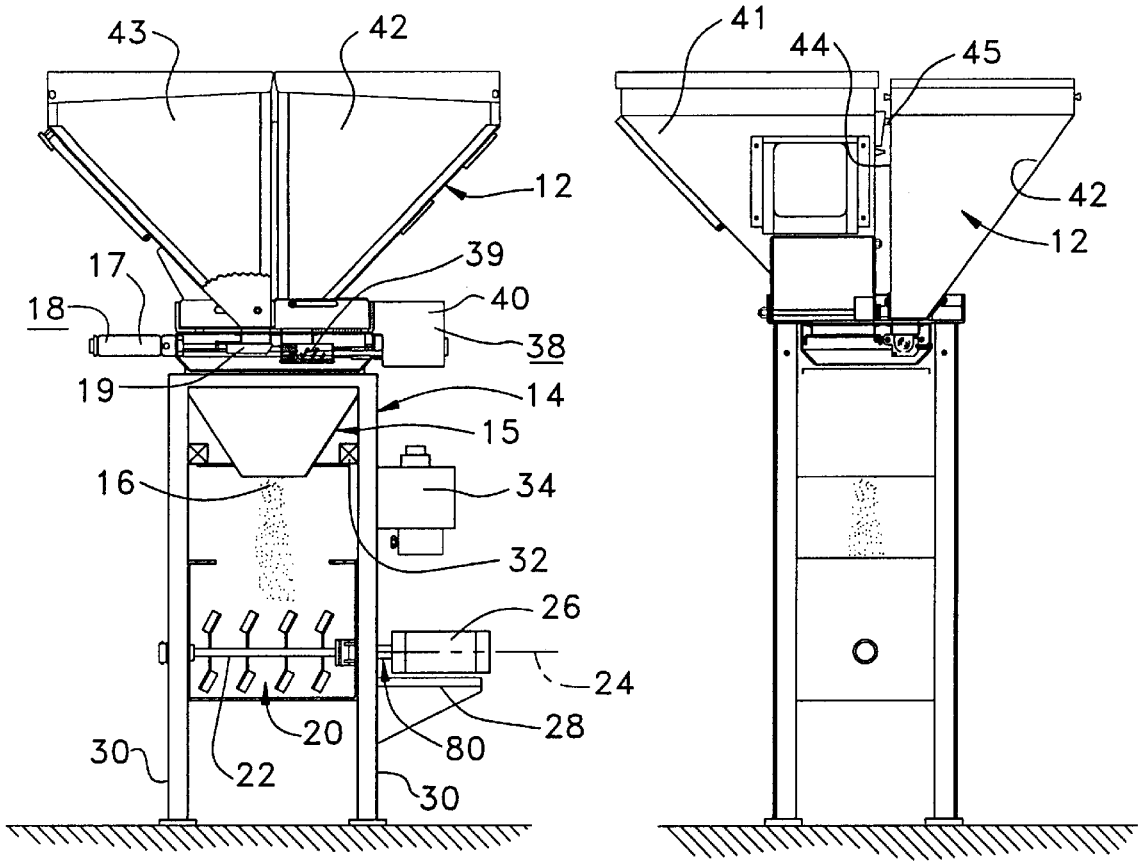
FIG. 1
FIG. 3
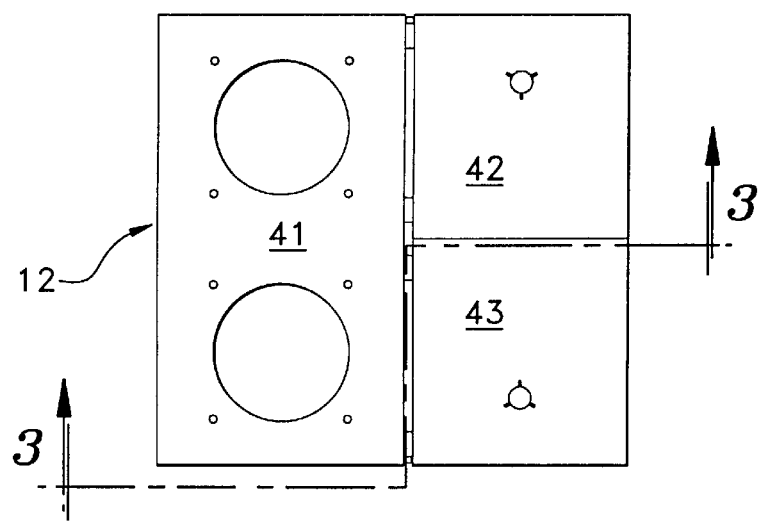
FIG. 2

6,057,514

REMOVABLE HOPPER WITH MATERIAL SHUT-OFF

This application claims priority from provisional application No. 60/020,857 filed on Jun. 28, 1996.

BACKGROUND OF THE INVENTION

This invention relates generally to methods and apparatus for storing and then providing precisely measured amounts of granular material(s) preparatory to further processing of the granular material(s), particularly for providing precisely measured amounts of plastic resin material(s) to plastics manufacturing and processing equipment such as plastic injection molding, compression molding and extrusion equipment. Specifically, the invention relates to improvements in gravimetric weigh scale blender apparatus which facilitate cleanout of the hopper compartments both during operation and between batches.

FIELD OF THE INVENTION AND DESCRIPTION OF THE PRIOR ART

The modern weigh scale blender was essentially originated by the applicant of this invention and is widely used throughout the world by industries concerned with precision feeding of granular material, especially plastic resin material.

Weigh scale blenders operate by blending solid plastic resin components and additives, by weight, in batches of material. Typically batches of material may consist of two or more and many times several solid material components. One of these may be "regrind", consisting of ground plastic resin which had previously been molded or extruded and which either resulted in a defective product or was excess material not formed into a desired product. Another component may be "natural" plastic resin which is virgin in nature in the sense that it has not previously been processed into a molded or extruded plastic part. A third component may be a solid color additive material component, typically flakes or freeze dried material, used to produce a desired color of the finished plastic part. A fourth component may be an additive used to adjust the blend to provide required performance characteristics during molding, extruding or subsequent processing.

The weigh scale blender as originated by the applicant hereto and as copied widely throughout the world typically includes hoppers for each of the components of the solid material to be blended together. Typically several hoppers or several compartments in a hopper may be provided, such as one compartment for "regrind" material, one compartment for "natural" material, one component for solid color additive material and one compartment for "additive".

When the blender operates, the unit desirably operates automatically, adding the component solid materials in the proper, desired percentages and maintaining the proper amount of material in a mixing chamber within which the components are blended together. Typically each solid material component is dispensed by weight into a single weighing chamber and onto a weigh pan or weigh bin (these two terms being synonymous and interchangeable as used herein) at the bottom of the weighing chamber. Once the proper amounts of each component have been serially dispensed on to the weigh pan, all of these weighed, metered components are dropped together into the mixing chamber from the weighing chamber.

Mixing is performed, preferably continuously, in the mixing chamber. When mixing is complete, the resulting blend is preferably provided directly to the desired molding or extrusion machine.

It is known to provide feedback control of the dispensed amounts of each solid material component provided to the weighing chamber and measured by the weigh pan so that in the event of an error in the amount of a dispensed component, the succeeding batch may have the blend adjusted to account for the error in the preceding batch of blended material.

As one of the components forming a part of the resulting blend it is known to supply solid color additives to the blend in order to provide a blend of a desired color. These color additives may be flaked pigments on wax carriers or in freeze dried form. It is also known to provide the color as pigment powder constituting one component of the resulting blend. It has been found desirable to arrange the multiple hoppers in a cluster so that the discharge from each hopper and its associated weigh pan discharges directly into the mixing chamber. In one aspect, the prior art blenders provided a generally funnel-shaped hopper having internal compartments with separate shut-off gates and weigh pans in registry with the open neck portion of the funnel-shaped hopper. To facilitate cleanout of the compartments, it is desirable to mount the compartments so that they may be individually removed. To avoid spillage, each removable hopper has a shut-off mechanism, usually a slide gate which is pushed into the neck of the removable hopper to cut off the flow through the neck.

The slide gate may be supplemental to the dispensing control which is normally operated automatically to control the flow of the components onto the weigh pan or weigh bin at the bottom of the weighing chamber. The normal control is a slide gate which is operated by a fluid cylinder between and open and closed position.

SUMMARY OF THE INVENTION

In one of its aspects this invention provides a gravimetric weigh scale blender/color addition pump combination where the blender includes a frame, a hopper slidably supported on the frame, a pan below the hopper and load sensing means mounted on the frame for sensing weight of the pan, and a mix chamber preferably below the pan includes mixing means therewithin.

The blender preferably further includes pneumatic piston actuated means preferably connected to the pan controlled by a microprocessor responsive to the load-sensing means for releasing material therewithin into the mix chamber. A motor connected to the frame preferably rotates the mixing means within the chamber. In another of its aspects this invention embraces a method for preparing plastic resin material for manufacturing processing such as molding or extrusion. The method includes monitoring the weight of material, if any, at a weighing station. The method further includes serially metering and/or regulating the feed of respective solid resinous materials to the weighing station until pre-selected weights of the respective materials are at the weighing station. The method further includes providing the serially metered materials unitarily to a mixing station. The method further embraces mixing the unitarily supplied serially metered materials into a blend preparatory to manufacturing processing via molding or extrusion.

A major improvement provided by the present invention resides in the mounting of at least one of the hopper compartments, and preferably two, so that it may be readily removed without substantial loss of the material remaining in the hopper. The present invention facilitates cleanout of the compartment, for example between batches where the formulation of the batches is changed. The improvements of the present invention also facilitate cleanout of the hoppers during operation, particularly when the materials in the hopper do not readily flow from the discharge end of the hopper. Specifically, the present invention provides an assisted discharge of the material from the hopper during operation.

BRIEF DESCRIPTION OF THE DRAWINGS

All of the objects of the invention are more fully set forth hereinafter with reference to the accompanying drawing, wherein:

FIG. 1 is a diagrammatic front view of a blender embodying the present invention;

FIG. 2 is a plan view of the blender shown in FIG. 1;

FIG. 3 is a sectional view taken along the line 3—3 of FIG. 2 showing the fixed and movable hoppers;

Figure 4:
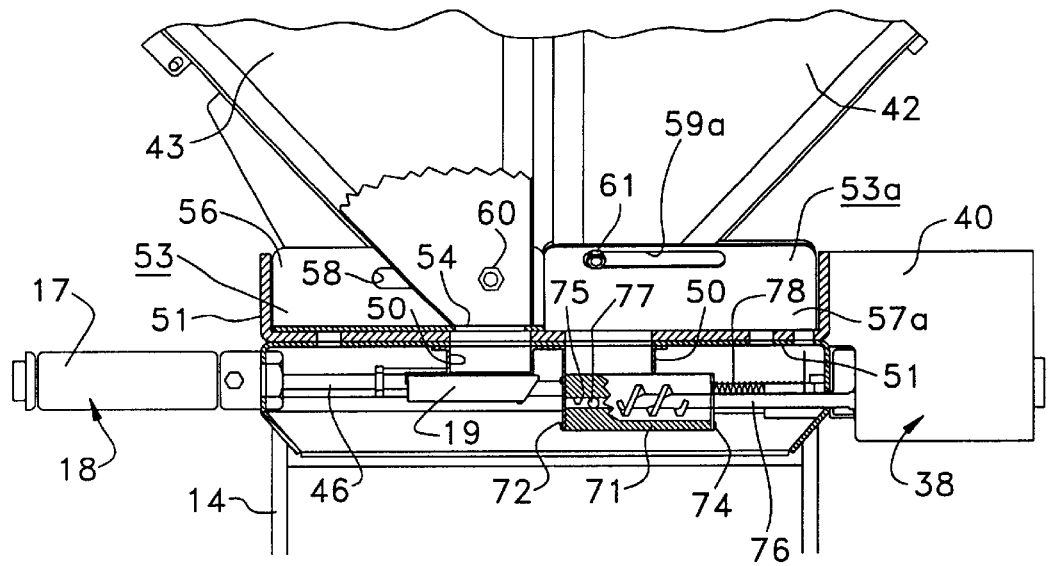
FIG. 4 is a fragmentary enlarged view of the lower portion of the hoppers shown in FIG. 1, portions of the auger feeding components being partially in section to show details of the feeding mechanism for controlling the discharge of materials from the movable hoppers, the lefthand hopper being broken away near its bottom to illustrate details of its mounting.

DESCRIPTION OF THE PREFERRED EMBODIMENT AND BEST MODE KNOWN FOR PRACTICING THE INVENTION

Referring to the drawings and to FIG. 1 in particular, a weigh scale gravimetric blender with a slidable hopper shut-off gate and screw-metered material supply means combination generally embodying aspects of the invention is indicated generally 10.

The weigh scale blender 10 includes a hopper, designated generally 12, supported by a frame designated generally 14 which holds a pan, referred to as a weigh pan 16, in position below hopper 12. The weigh pan 16 defines a bottom portion of a weigh chamber 15 within which portions of plastic resin material in accordance with the invention can be measured prior to release into a mix chamber as described below.

The blender 10 may further include metering means in the form of pneumatically actuated piston means, housed within a cylinder 17, which is connected with one of the compartments of the hopper 12 via a slide gate 19 which operates in response to a signal to release material stored within the hopper 12 or a portion thereof downwardly towards the weigh pan 16. The pneumatic piston-cylinder actuated slide gate combination is designated generally 18 in FIG. 1. A second metering means in the form of a feed auger 39 operated by a drive motor 40 is connected with another compartment of the hopper 12. The auger metering means is designated generally 38 in FIG. 1.

Positioned within and retained in place by the frame 14 below the weigh pan 16 is a mix chamber 20 having a mixing means or a mixing agitator 22 rotatably disposed therewithin, which is rotatably mounted on an axis 24 preferably shared in common with a drive motor 26. The motor 26 preferably has a drive shaft positioned on the axis 24 to drive the mixing agitator 22 about the common axis 24. The drive motor 26 is preferably supported by a cantilevered support 28 extending laterally from an upstanding member 30 of the frame 14.

Weight of material on the weigh pan 16 is preferably sensed by load cells 32 which are preferably connected to a microprocessor control means 34 which regulates operation of the gravimetric weigh scale blender combination 10.

The micro-processor 34 provides control of the weigh scale blender 10 by continuously monitoring weight of material, if any, at a weighing station defined by the weigh pan 16. By sensing the weight of the weigh pan and opening appropriate slide gates 19 and/or actuating a feed auger 39, micro-processor control means serially meters respective components of resinous material to the weighing station defined by the weigh bin chamber and the weigh pan 16 until a pre-selected weight of each of the respective components has arrived at the weigh station.

The micro-processor 34, through monitoring weight of the weigh pan and material thereon, meters each component to the weighing station defined by a weigh chamber 15 and the weigh pan 16 and adds the metered component to the respective components of material at the weigh station until a pre-selected weight of the metered component has arrived at the weigh station. The micro-processor control means then provides the serially metered components unitarily to a mixing station defined by the mix chamber 22 by opening or tilting the weigh pan 16 thereby to permit the materials vertically supported thereby to fall downwardly into the mix chamber 22.

In the mix chamber 20, the unitarily supplied serially metered components material are mixed into a blend of the desired proportions preparatory to being supplied to a manufacturing processing machine such as a molding press or an extrusion machine.

Desirably, the monitoring of the weight of material at the weighing station is performed continuously.

The control means 34 actuates solenoid-controlled pneumatic valves, which are not illustrated in FIG. 1 to provide pneumatic pressure via suitable conduits to piston-cylinder slide gate combinations 18, and/or actuates a drive motor for the auger 39. Specifically, the control means 34 is connected via suitable conduits to associated individual piston-cylinder slide gate combinations 18 and the drive for the feed auger 39.

Each slide gate combination 18 associated with a given hopper compartment is biased to a preferred position, referred to as the default position, for operation of the weigh scale blender 10. When due to a change in operational factors, the control means 34 senses that it is required to actuate a given piston of a piston-cylinder slide gate combination 18 or a feed auger assembly 38, for example to open a selected one of the compartments within hopper 12 to increase the amount of material component in that selected compartment provided to the weigh pan 16, control means 34 actuates the slide gate combination of the selected compartment thereby momentarily moving the selected piston-cylinder slide gate combination 18 from the default position to a second position at which the selected hopper slide gate is opened or other desired action has been taken.

In the illustrated embodiment of the invention, the hopper comprises a fixed compartment 41 and movable compartments 42 and 43. In the present instance, the fixed compartment 41 extends the full depth of the unit, whereas the movable compartments 42 and 43 are half the depth of the unit. As shown in FIG. 3, a support guide component 44 is mounted on the fixed compartment 41, and each of the movable compartments 42 and 43 has a slide 45 which slides upon and is supported by the support guide 44 for lateral movement of the compartment in a direction away from the other movable compartment. The fixed compartment 41 has a metered outlet opening 47 controlled by a slide gate 19 (see FIG. 5) connected to a piston in a pneumatic cylinder 17. The gate slides on a pair of support rods 46 which extend horizontally below the openings of the respective compartments.

Each compartment of the hopper tapers downwardly and terminates in a discharge opening which registers with a complementary opening 50 in a cross-piece 51 of the frame (see FIG. 4). The cross-piece 51 has upstanding flanges which form between them a saddle receptacle into which the bottoms of the removable hoppers 42 and 43 fit. When in the operative position as shown in FIG. 4, the opening at the bottom of the funnel-shaped hopper compartment 42 is in registry with the passage 50 which permits flow of material through the auger feed assembly which provides metered discharge of the contents of the hopper to the weigh compartment 14 and into the weigh pan 16 mounted on the load cells 32 in the frame 14 below the opening 50. The opening at the bottom of the funnel-shaped hopper compartment 43 is in registry with the passage 50 which permits flow of material under control of the slide 45, and discharge of the contents of the hopper compartment 43 to the weigh compartment 14 and into the weigh pan 16 mounted on the load cells 32 in the frame 14 below the opening 50.

Figure 8:
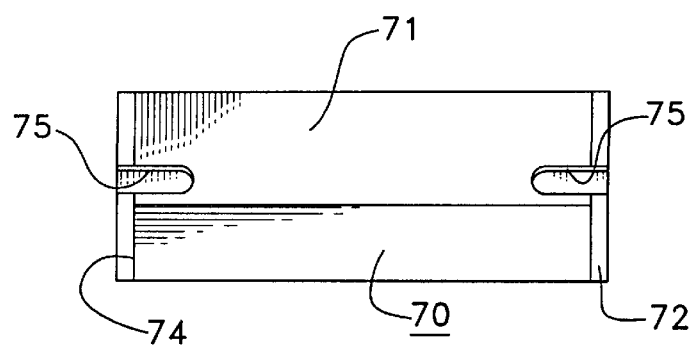
FIG. 8 is an isometric view of the shoe mounted on the bottom of the movable hopper.

The movable hopper 43 is provided with a bottom shoe 53 (see FIG. 8) which fits within the saddle formed in the cross-piece 51 and supports the movable hopper 43 on the frame 14. The movable hopper 42 has a similar shoe 53a which supports the hopper 42 on the frame 14. When hoppers are in the operative position shown in FIG. 4, the vertical wall of each movable hopper abuts the corresponding vertical wall of the adjoining hopper, and the feed opening at the bottom of each hopper is in registry with an opening 50 and the similar sized opening 54 or 54a in the shoe 53 or 53a. Each opening registers with the bottom of the hopper 42 and the opening 50 in the cross-piece 51. As shown in FIGS. 4 and 8, the shoe 53 receives the bottom of the movable hopper 43, and has a vertical wall 56 engaging the vertical back of the hopper and an inclined wall 57 mating with the front of the hopper. The rear wall 56 has a longitudinal slot 58 and the front wall 57 has a longitudinal slot 59. The shoe 53 is mounted for sliding displacement relative to the bottom of the hopper by a bolt 60 which engages through the back wall of the hopper and the slot 58 and a bolt 61 which mounts on the sloping front wall of the hopper 43 and passes through the slot 59. The other movable hopper is engaged with the shoe 53a, which is a mirror image of the shoe 53.

When each of the hoppers 43 and 42 is displaced outwardly (to the left and right respectively in FIG. 4), the bolts permit the hopper to move relative to the shoe, and displacement of the hopper in the shoe 53 causes the open bottom of the hopper to pass out of registry with the opening 54 and to effectively close the open bottom of the hopper. As seen in FIG. 4, the shoes 53 and 53a which are slidably mounted on the bottom of the hoppers 43 and 42 fit within the saddle formed between the upstanding flanges of the cross-piece 51. The upper ends of the hoppers are supported, as shown in FIG. 3, by the slides 45 engaging over the guides 44 fixed to the stationary compartment 41 of the hopper 12. The slides 45 permit the hopper to be displaced laterally outward away from each other with the bolts 60 and 61 sliding in their respective slots 58 and 59. The ends of the slots 58 and 59 define the front (closed) and back (open) limits of the relative sliding displacement of the shoe and the bottom of the hopper. When pulled outwardly to its front limit, the bottom of the displaced hopper is closed by reason of the open bottom passing out of registry with the opening 54. The hopper may then be raised off the guides at the top of the compartment 41 and removed for cleanout. When removed for cleanout, the shoe associated with the hopper is in its closed limit position out of registry with the open bottom of the hopper so that the shoe effectively prevents spillage of the material from the hopper during cleanout.

After cleanout of the hopper, the hopper may be replenished with a fresh supply of material for mixing a subsequent batch in the process. The replenished hopper may then be replaced, and during the replacement operation, the shoe 53 at the bottom of the hopper serves to prevent spillage of the replenished material from the bottom opening of the hopper. The shoe is dropped into the saddle provided by the flanges 51 and the slide 45 on the movable hopper is engaged with the guide 44 on the fixed hopper and the movable hopper may then be displaced to its operating position in which the open bottom of the hopper registers with the opening 54 in the shoe, which in turn registers with the opening 50.

The present invention also provides an auger feed for assisting the discharge of material through the bottom of the hopper 42. The slide gate 19 shown in connection with the hopper 43 is fully effective for materials which readily flow through the open bottom of the hopper, the opening 54, and the outlet 50 when the slide gate 19 is displaced by the pneumatic cylinder 17. However, for some materials, it is desirable to provide an assisted discharge so as to have a better control over the discharge of the material. To this end, the hopper 42 is provided with an auger feed assembly 38 which assists the discharge of the material passing through the bottom of the hopper 42 and through the openings 54 and 50.

Figure 5:
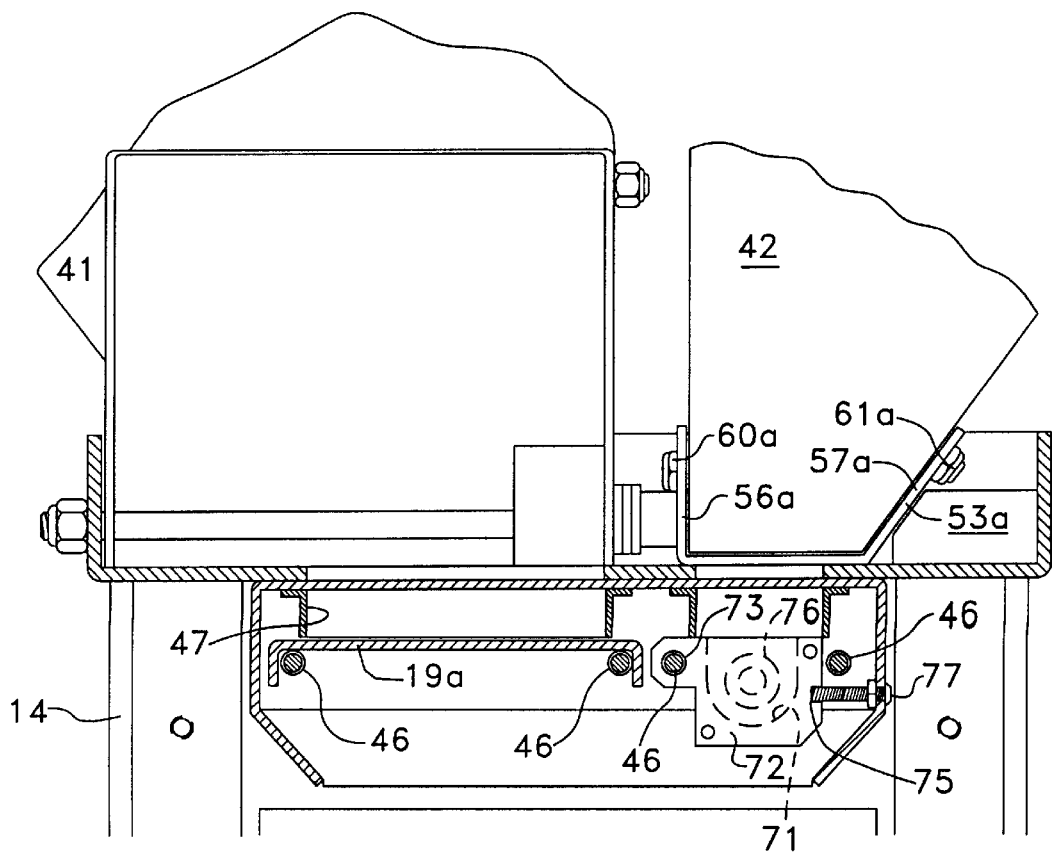
FIG. 5 is a similar fragmentary enlarged view of the lower portions of the hoppers shown in FIG. 2.
Figure 6:
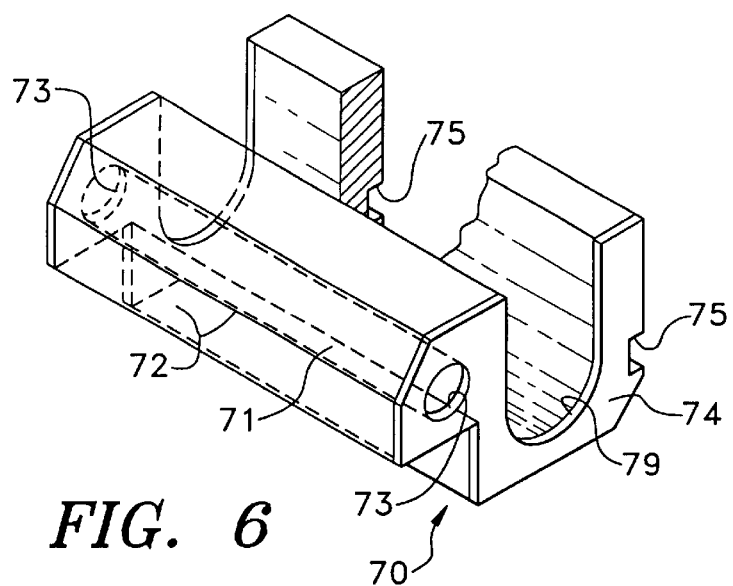
FIG. 6 is an isometric view of the casing or trough for the auger feed shown in FIG. 4 with a portion broken away to show features of the trough.

As shown in FIGS. 4 and 5, auger feed assembly 38 is mounted on the rods 46 which slidably support the sliding gate 19. The auger feed assist mechanism comprises a U-shaped casing 70 comprising an elongated block 71 having an inner end plate 72 which has an extending lug which provides a longitudinal bore 73 pivotally supported on a guide rod 46 extending along the full depth of the cross-piece 51 below the bottoms of the hoppers. The opposite side of the end plate 72 is provided with a receptacle 75 which receives a set screw or pin 77 which cooperate to releasably support the U-shaped trough 71 in registry with the opening 50 in the cross-piece 51. The block 71 forms a trough which receives a screw auger 76. At the inner end of the casing 70, the end plate 72 closes the trough 71. The auger 76 is journaled in the frame 14 and is driven by a motor 40 controlled from the controller 34. The screw auger 76 extends along the length of the trough and terminates short of the end closure 73 of the trough. At the inner end, the block 71 is supported by the end plate 74 on the rod 46 for pivotal displacement. The lock pin 77 (FIG. 4) is provided at the rear end of the trough to retain the casing in proper position under the opening 50. A spring 78 is provided at the front end of the casing to bias the casing 70 into its position where the lock pins 77 engage the casing.

When the casing 70 is in position shown in FIG. 4, the auger 76 is free to rotate within the trough under the control of the drive motor 40 in the auger feed assembly 38. The speed of the motor 40 may be adjusted by the controller 34 to assure the desired rate of feed of the material from the hopper 42 into the weigh pan 16, and facilitate cleanout of the hopper during operation of the blender. To limit spillage from the auger trough 71, the end wall 74 at the front of the casing is provided with a lip 79 which provides a weir for limiting the flow of material out of the trough independently of the rotation of the auger. Thus, with the lip 79 projecting slightly above the bottom wall of the trough 71, the flow of material is controlled by the auger feed 38 and is not subject to gravity flow and spillage. The rotation of the auger 76 in the trough serves to advance the material discharged from the opening 50 from underneath the opening outwardly along the bottom of the trough and over the lip 79 into the weigh pan 16. In this way, the auger feed mechanism operates which assists in the regulated discharge of less fluent material.

Because the material being discharged from the opening 50 is normally less fluent than other materials, the present invention provides for the pivotal mounting of the block 71 under the opening so that the casing 70 may be displaced to facilitate cleanout of the opening in the event of clogging or other problems during the discharge of material therethrough, and also to facilitate the cleanout of material from the hoppers of the gravimetric weigh scale blender apparatus, and enables the blender to be accommodated for mixing batches of material in sequences where one or more of the components need to be replaced between batches.

Figure 7:
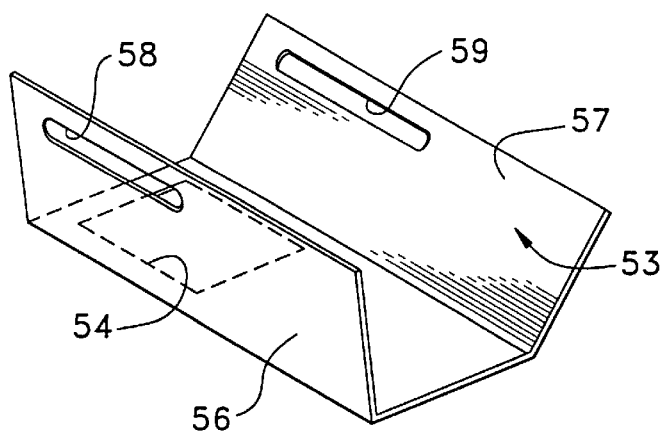
FIG. 7 is a rear elevational view of the trough shown in FIG. 6.

When it is desired to displace the block 71 to eliminate clogging or to gain access to the outlet openings 54 and 50, the block 71 is displaced outwardly on the rod 46, the bore 73 affording sliding displacement of the block against the bias of the spring 78. As shown in FIG. 7, the block has two receptacles 75 on its rear surface for accommodating the pin. When used, only one of the receptacles is in operation, the other receptacle being provided when the trough is reversed to be used with another hopper. The receptacle 75 extends inwardly from the inner end of the block 71 so that when the block is moved longitudinally, the pin passes through the receptacle 75 and disengages the same so that the block 71 is free to be pivoted downwardly away from the openings 50 and 54. When it is desired to reposition the block to its operative position, it is pivoted up to the level shown in FIGS. 4 and 5, and is displaced by the spring 78 longitudinally so that the pin enters the receptacle 75. The end of the recess 75 limits the longitudinal displacement of the block to establish the operating position of the block under the opening 50.

The pivotal mounting of the block 71 also facilitates the cleanout of the assembly when replacing the movable hoppers, for example when changing the components to be blended between successive batches.

The particular construction of the movable hoppers and the auger assembly enables the removal and changeover of hoppers without special tools.

While particular embodiments of the invention have been herein illustrated and described, it is not intended to limit the invention to such disclosures, but changes and modifications may be made therein and thereto.

I claim:
1. A gravimetric blender comprising:
 a. a frame;
 b. a hopper removably mounted on said frame and horizontally slidably movable with respect thereto between first and second positions;
 c. a weigh chamber mounted on said frame below said hopper;
 d. said hopper including a discharge opening located substantially over said weigh pan when said hopper is at said first position;
 e. a weigh pan defining the bottom of said weigh chamber;
 f. means, mounted on said frame, for sensing weight of material supported by said weigh pan in said weigh chamber;
 g. a mix chamber below said weigh chamber including mixing means therewithin; and
 h. metering means connected to said weigh pan for selectively releasing material supported by said weigh pan in said weigh chamber downwardly into said mix chamber;
 i. said hopper having a shoe movable with respect thereto and providing a valve between said hopper discharge opening and said mix chamber; said shoe being removable with said hopper from said frame;
 j. means for mounting said shoe on said hopper for displacement between an open-valve condition and a closed-valve condition,
 k. an operator engaging said shoe for effecting said displacement,
 l. said operator being responsive to said horizontal slidable movement of said hopper to position said shoe in the open-valve position when said hopper is at said first position and to displace said shoe to the closed-valve position when said hopper is slidably moved toward said second position;
 m. said shoe comprises a valve opening in registry with said discharge opening in the open valve condition and out of registry with said discharge opening in the closed-valve condition, and
 n. said operator comprises a saddle on said frame abutting said shoe for effecting shoe displacement relative to the hopper when said hopper is moved horizontally with respect to the frame;
 said discharge opening being planar with parallel opposite sides,
 the bottom of said hopper having side walls converging downwardly to provide a funnel terminating in said parallel sides of the discharge opening,
 one of said side walls being vertical and terminating in one of said parallel sides, and an opposite side wall being inclined and terminating in the opposite of said parallel sides of the opening,
 said shoe having a bottom plate coplanar with said opening, and upstanding vertical and inclined side flanges slidably engaging said vertical and inclined side walls respectively,
 said operator being operable to displace the shoe in the plane of the opening in a path parallel to said parallel sides of the opening.

\* \* \* \* \*